(12) United States Patent
Davison et al.

(10) Patent No.: US 6,397,668 B1
(45) Date of Patent: Jun. 4, 2002

(54) FUEL LEVEL MONITOR

(75) Inventors: Lynn Edward Davison, Saline; Thomas Robert Melville, Northville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/540,327

(22) Filed: Mar. 31, 2000

(51) Int. Cl.[7] .............................. G01L 3/26; G01F 23/00
(52) U.S. Cl. ............................................. 73/113; 73/291
(58) Field of Search ........................... 73/115, 114, 113, 73/290 R, 291; 123/1 A

(56) References Cited

U.S. PATENT DOCUMENTS 4,246,778 A * 1/1981 Fiala ........................... 73/114
4,444,047 A * 4/1984 Kern ........................... 73/114

* cited by examiner

Primary Examiner—Benjamin R. Fuller
Assistant Examiner—Maurice Stevens
(74) Attorney, Agent, or Firm—Julia Voutyras; John D. Russell

(57) ABSTRACT

A method is presented for determining whether a fuel sensor in a vehicle having a fuel tank, a fuel delivery system, electronic engine controller, air flow and air/fuel ratio sensors and an instrument panel is stuck in-range. First, the electronic engine controller from the information provided by the above sensors estimates an amount of fuel consumed. The estimate is then compared to the actual fuel consumed data from the fuel sensor. If the difference between the actual and estimated amounts exceeds a small predetermined constant, the determination is made that the fuel sensor is stuck in-range and a diagnostic code is sent to the instrument panel and stored for use by a service technician.

21 Claims, 5 Drawing Sheets

FUEL LEVEL MONITOR

FIELD OF THE INVENTION

The field of the invention relates to a system for estimating fuel consumption in a vehicle equipped with an internal combustion engine, using mass airflow and the air/fuel ratio, and in particular, to using this information for determining whether the performance of a fuel level sensor is degraded.

BACKGROUND OF THE INVENTION

Vehicles typically have a fuel level sensor for determining fuel levels and a fuel gage for displaying the information to the driver. There are also methods in place to provide the driver with miles to empty and miles per gallon estimates. Also, there is usually a diagnostic system in place to inform the driver of out of range fuel sensor degradations. In particular, if the fuel level sensor is stuck in high or low, an indicator is provided to the driver.

The inventors herein have recognized a disadvantage with using a fuel level sensor diagnostic method based only on out of range checks. For example, if expected fuel level sensor voltage limits are 0.5–4.5V, the driver will be informed when the voltage level falls below 0.5V or above 4.5V. Using this approach, one cannot determine if the fuel level sensor is inaccurate or stuck within a normal operating range. This may provide the driver with degraded information and may cause inconvenience.

SUMMARY OF THE INVENTION

An object of the present invention is to provide a method for diagnosing a fuel level sensor of a vehicle equipped with an internal combustion engine.

The above object is achieved and disadvantages of the prior approaches are overcome by a method for estimating vehicle fuel consumption and diagnosing a fuel level sensor coupled to vehicle. The method comprises determining a first estimate of fuel consumed using vehicle operating conditions; determining a second estimate of fuel level based on said first estimate; reading the fuel level sensor; and comparing said second estimate with said reading to determine whether said sensor is functioning.

In another aspect of the invention, the method comprises estimating a first fuel consumed using vehicle operating conditions; estimating a second fuel consumed based on the fuel level sensor; and determining that the fuel level sensor is degraded based on comparing said first fuel consumed and said second fuel consumed.

An advantage of the above aspect of the invention is that a robust test for in-range failures of the fuel level sensor is developed, which decreases driver inconvenience. Another advantage is that a more precise method of fuel consumption calculation is achieved. In another aspect of the invention, the method also accounts for refueling by customers and memory resets by service technicians.

Other objects, features and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings wherein:

DESCRIPTION OF THE INVENTION

Figure 1:
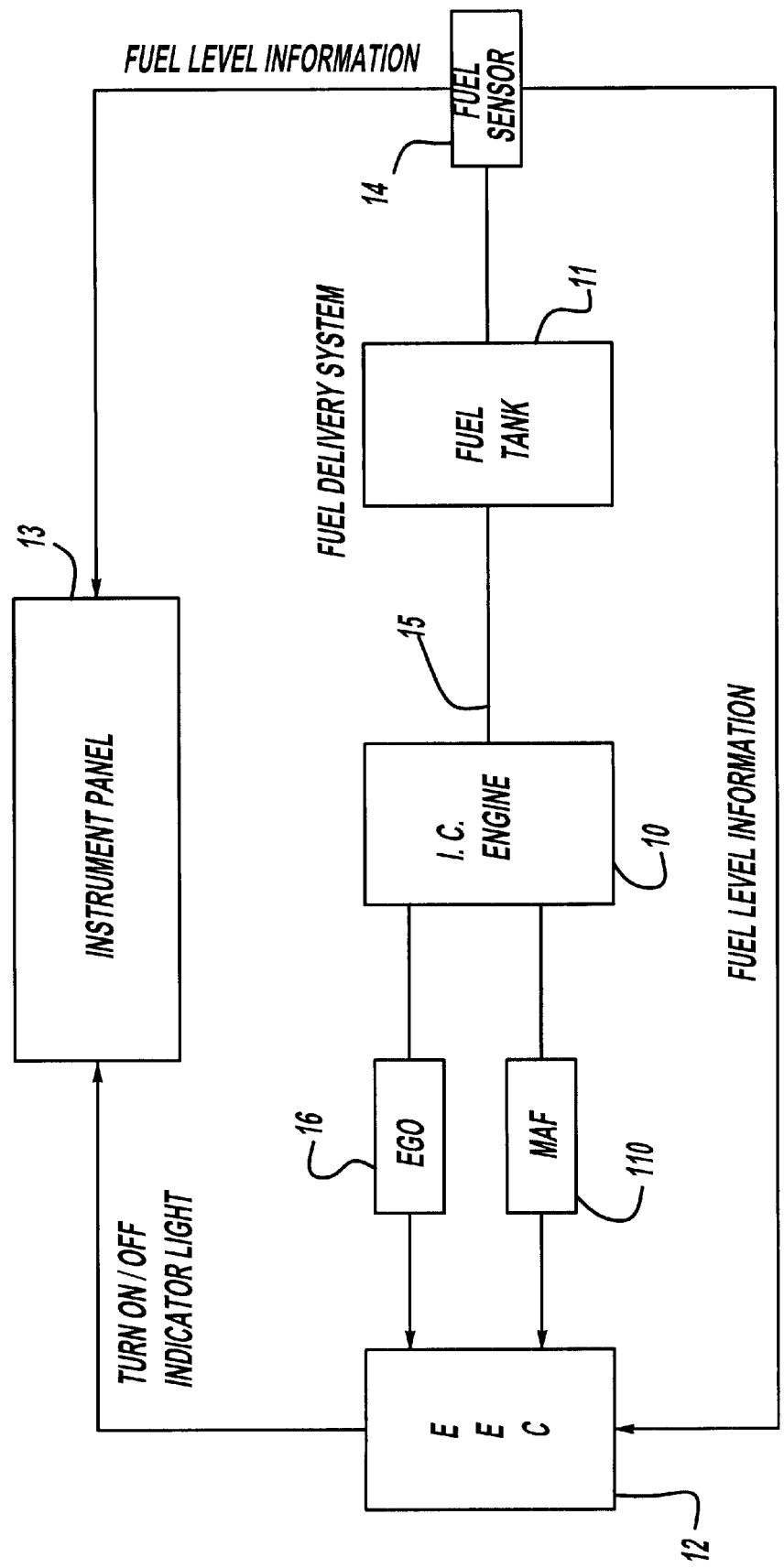
FIG. 1 is a block diagram of a vehicle illustrating various components related to the present invention.
Figure 2:
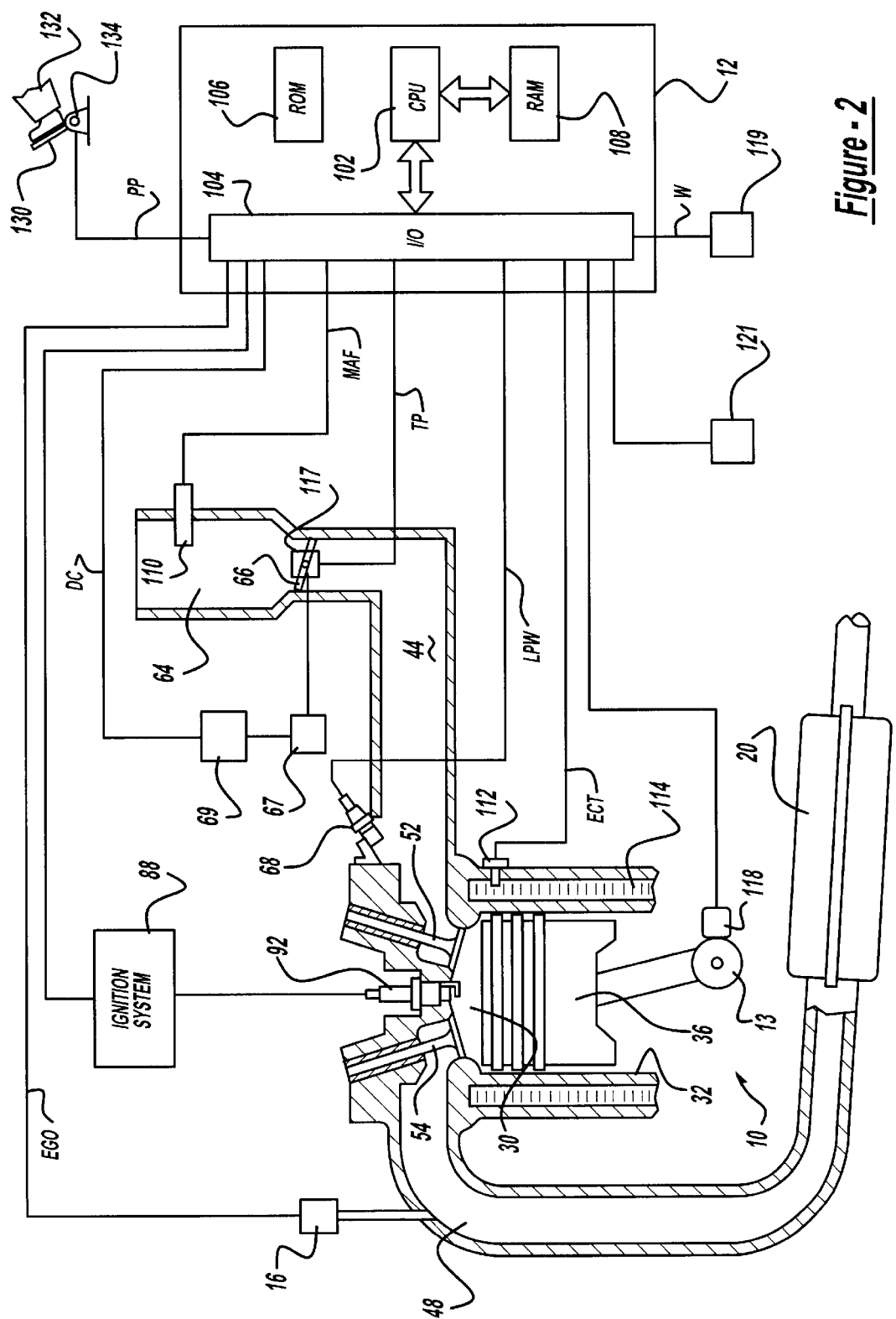
FIG. 2 is a block diagram of an engine in which the invention is used to advantage.

Referring to FIG. 1, electronic engine controller 12, further described herein with particular reference to FIG. 2, is shown receiving the following signals from sensors coupled to the internal combustion engine 10: measurement of the inducted mass airflow (MAF) from mass air flow sensor 110 and measurement of the air/fuel ratio from the exhaust gas oxygen (EGO) sensor 16. The electronic engine controller also receives fuel level information from the fuel sensor 14, which is coupled to the fuel tank 11. The fuel tank is coupled to the engine via the conventional fuel delivery system 15.

The fuel level sensor also provides fuel level information to the instrument panel 13. The electronic engine controller provides fuel level sensor diagnostics to the instrument panel.

Internal combustion engine 10 having a plurality of cylinders, one cylinder of which is shown in FIG. 2, is controlled by electronic engine controller 12. Engine 10 includes different cylinder groups, consisting of one or more:cylinders, also known as engine banks. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a heated exhaust gas oxygen (HEGO) sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP)

from Hall effect sensor 118 coupled to crankshaft 13 indicating an engine speed (We). Alternatively, turbine speed may be determined from vehicle speed and gear ratio.

Figure 3A:
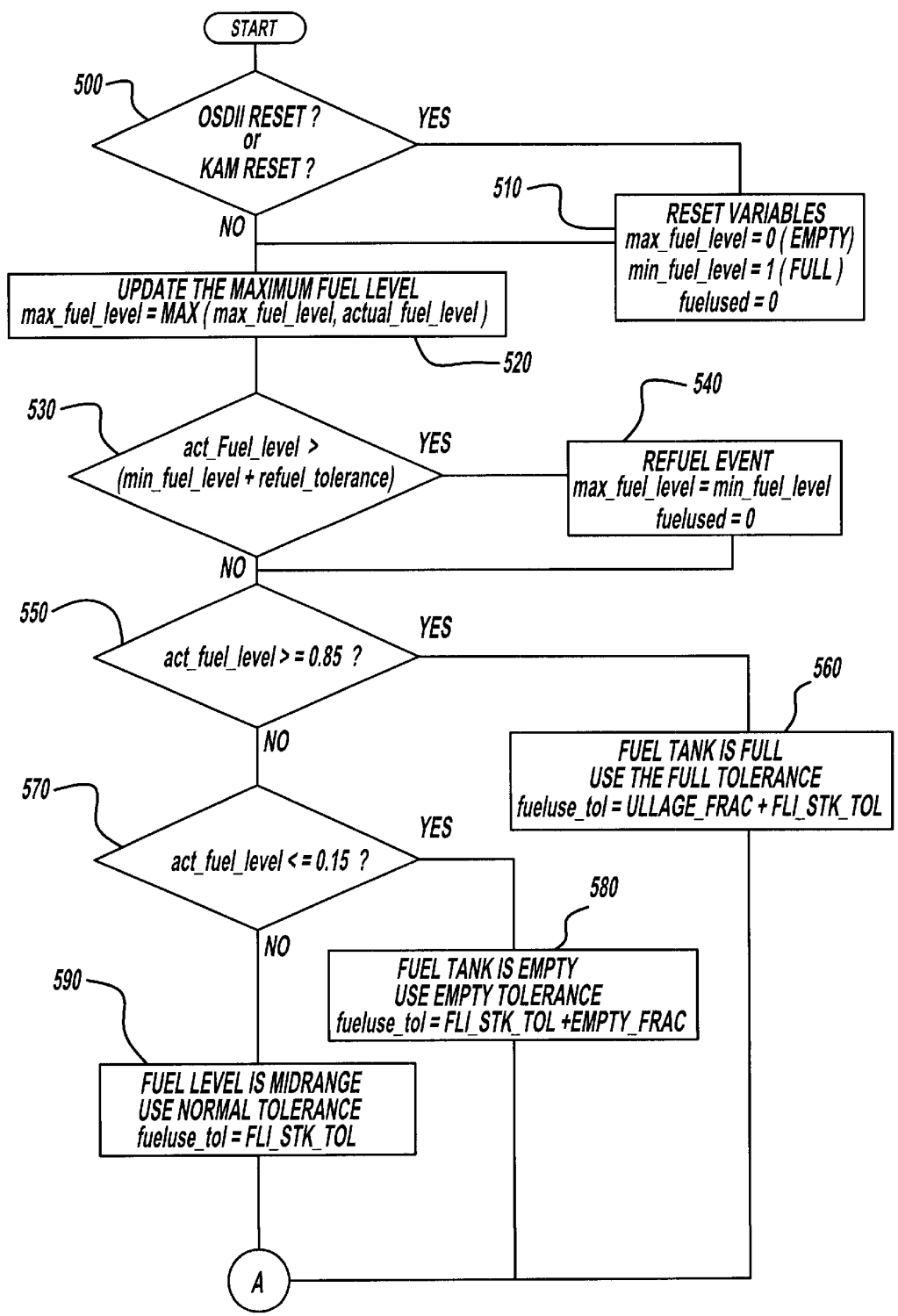
FIG. 3 is a block diagram of embodiment in which the invention is used to advantage.
Figure 3B:
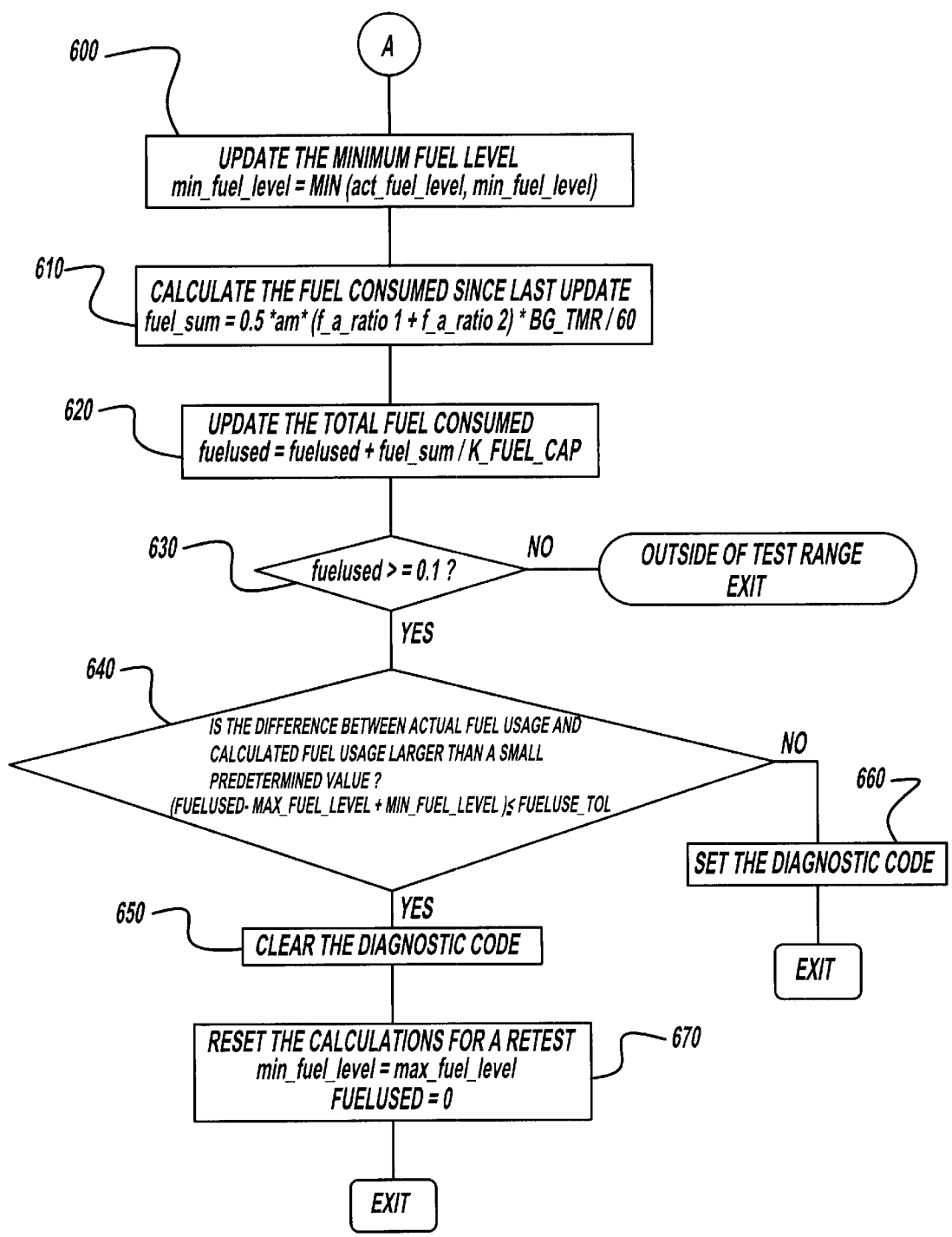

Referring now to FIG. 3, a routine is described for determining whether the fuel level sensor is functioning properly. First, in step 500, a determination is made whether OBDII (On-Board Diagnostics) or KAM (keep-alive memory) have been reset in the vehicle. This can happen when the vehicle battery has been removed, or by a reset from a service technician. If the answer to step 500 is YES, variables that store minimum and maximum fuel levels and the amount of fuel used are re-initialized in step 510. In particular, the parameter min_fuel_level is set to 1 (full), max_fuel_level is set to 0(empty), and fuelused is set to 0. If the answer to step 500 is NO, the routine moves to step 520 whereupon maximum fuel level, max_fuel_level, is set to be the larger of maximum fuel level and the actual fuel level information received from the fuel sensor, act_fuel_level. Next, in step 530, a determination is made whether the vehicle has been refueled. This is done by keeping track of the change in the fuel level and comparing it to the minimum fuel level as follows:

$$act\_fuel\_level > (min\_fuel\_level + refuel\_tol),$$

where refuel_tol is a small, predetermined tolerance constant.

According to the present invention, this accounting for memory resets and refueling prevents degradation in estimates of fuel consumed. If the answer to step 530 is YES, the determination is made that the to vehicle has been refueled, and the routine moves to step 540, where min_fuel_level is set to be equal to the max_fuel_level, and the amount of fuel used during the drive cycle, fuelused, is set to zero. The routine then proceeds through steps 550–590, whereupon the value of a calibratable tolerance constant, fueluse_tol is set depending on actual fuel level, act_fuel_level, as read by the fuel sensor. For example, if act_fuel_level is greater than or equal to 0.85 percentage ratio of useable fuel, fueluse_tol=ULLAGE_FRAC+FLI_STK_TOL (step 560), if act_fuel_level is less than or equal to 0.15 percentage ratio of useable fuel, fueluse_tol=LI_STK_TOL+EMPTY_FRAC (step 580), otherwise fueluse_tol =FLI_STK_TOL. ULLAGE_FRAC, FLI_STK_TOL and EMPTY_FRAC are all calibratable constants. The upper and lower fill limits could be set at values different than 0.15 and 0.85.

The routine then proceeds to step 600, whereupon the minimum fuel level, min_fuel_level, is updated and set to be the lesser of the minimum fuel level and the actual fuel level, act_fuel_level, as read by the fuel sensor. Next, in steps 610 and 620, instantaneous fuel consumed, fuel_sum, and the total amount of fuel consumed, fuel_used, are calculated by integrating the product of the mass airflow, am, and the average fuel/air ration across the two cylinder banks, f_a_ratio1 and f_a_ratio2:

$$fuel\_sum = 0.5 * am * (f\_a\_ratio1 + f\_a\_ratio2) * bg\_tmr/60,$$

$$fuelused = fuel\_sum / K\_FUEL\_CAP,$$

where K_FUEL_CAP represents the total mass of fuel when the tank is full, and bg_tmr is the time between data samples or calculations. Thus, the amount of fuel consumed is calculated based on average air/fuel ratio and airflow. By using an average ratio the routine can account for variations between different engine cylinder groups, or banks. Proceeding to step 630, a determination is made whether the estimate of fuel consumed, fuelused, is greater than or equal to a small, predetermined value, such as 0.1. If the answer to step 630 is NO, the routine is exited. If the answer to step 630 is YES, a determination is made next in step 640 whether the estimate of fuel consumed, fuelused, exceeds the actual fuel consumed, as indicated by the fuel sensor by a value less than or equal to a small predetermined calibratable tolerance value, fueluse_tol. If the answer to step 640 is NO, a diagnostic code is set in the EEC and displayed in the instrument panel indicating in-range degradation in the fuel level sensor in step 660. The routine then proceeds to step 670, whereupon the amount of fuel used is set to zero, and the procedure starts over. If the answer to step 640 is YES, the routine proceeds to step 650 whereupon the diagnostic code in the EEC is cleared, and maximum fuel level is set to be equal to the minimum fuel level, and then the estimate of fuel consumed, fuelused, is set to be equal to zero in step 670. The routine then exits.

To summarize the above procedure, the electronic engine controller estimates the amount of fuel consumed, based on information from the air flow and air/fuel ratio sensors, and compares this estimate to the amount of fuel consumed as indicated by the fuel level sensor. If the difference between the two values exceeds a small, predetermined tolerance value, the fuel sensor is determined to be stuck in-range and a diagnostic code is set. In this preferred embodiment, fuel consumed, or a change in fuel, is used so that steady state offsets, such as due to a voltage bias, do not necessarily indicate degraded performance. In an alternative embodiment, the electronic engine controller estimates the amount of fuel consumed by integrating fuel injector pulse width across multiple engine cylinders.

Figure 4:
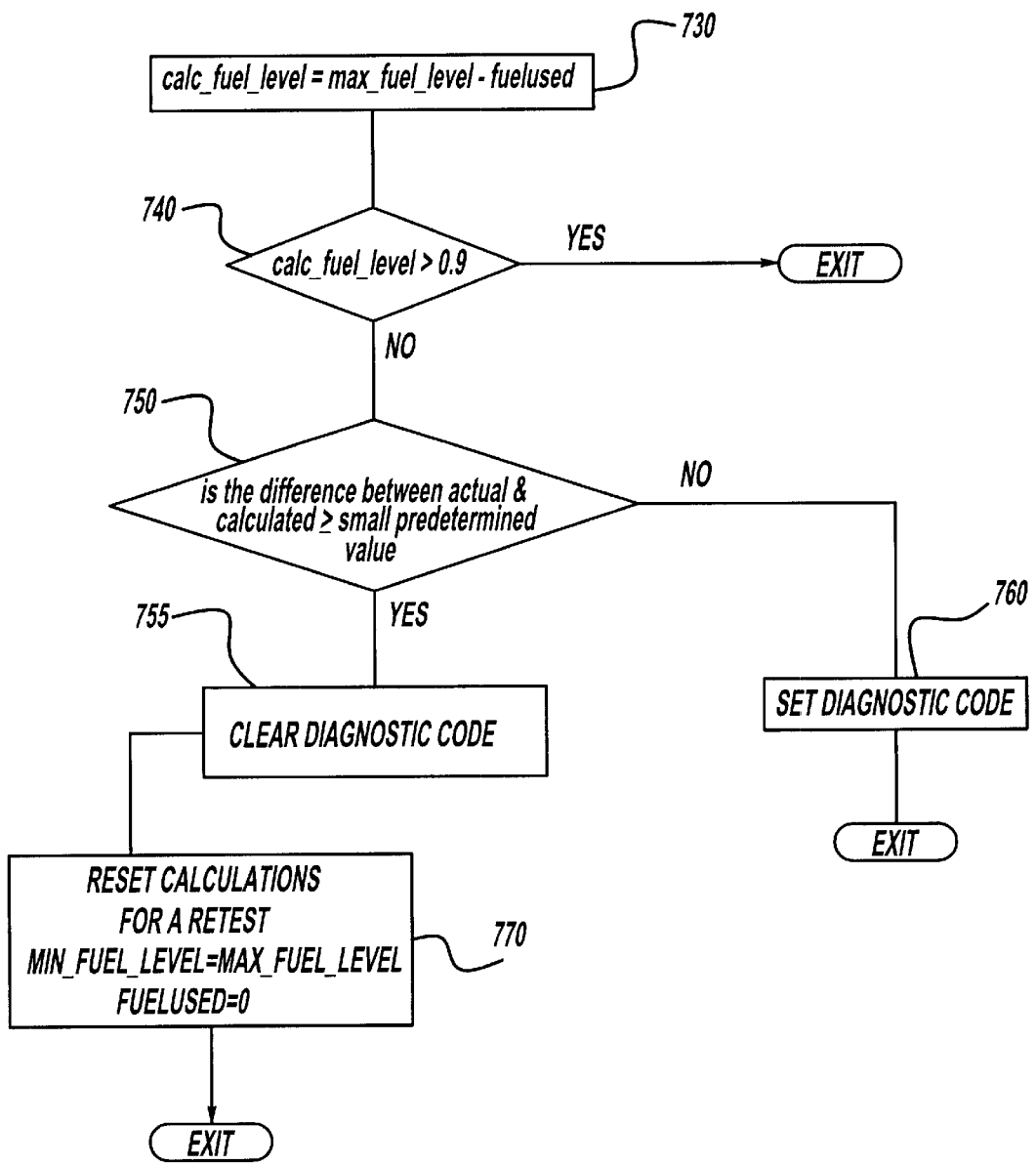

In an alternative embodiment, described in FIG. 4, calculated fuel level and fuel level as read by the fuel level sensor are compared to determine whether the fuel level sensor is functioning properly. Steps 700–720 in this embodiment are identical to steps 600–620 in FIG. 3, for calculation of total fuel consumed, fuelused. In step 730, calculated fuel level is determined as the difference between the maximum fuel level and the calculated amount of fuel used:

$$calc\_fuel\_level = max\_fuel\_level - fuelused$$

Next, in step 740 a determination is made whether calculated fuel level is greater than or equal to a predetermined value, such as 0.9. If the answer to step 740 is YES, the routine is exited. If the answer to step 740 is NO, a determination is made if the difference between the calculated fuel level and the fuel level as read by the fuel level sensor is greater than or equal to a small predetermined value. The routine then proceeds through steps 750–770, which are identical to steps 650–670 in FIG. 3.

This concludes the description of the invention. The reading of it by those skilled in the art would bring to mind many alterations and modifications without departing from the spirit and the scope of the invention. Accordingly, it is intended that the scope of the invention be defined by the following claims.

What is claimed is:

1. A method for estimating vehicle fuel consumption and diagnosing a fuel level sensor coupled to vehicle comprising the steps of:

determining a first estimate of fuel consumed using vehicle operating conditions;

determining a second estimate of fuel level based on said first estimate;

reading the fuel level sensor; and comparing said second estimate with said reading to determine whether said sensor is functioning.

2. The method recited in claim 1 wherein the vehicle includes an engine, wherein said operating condition is an engine operating condition.

3. The method recited in claim 2 wherein said engine operating condition is an air/fuel ratio.

4. The method recited in claim 2 wherein said engine operating condition is mass airflow.

5. The method recited in claim 1 further comprising indicating when said second estimate deviates from said reading by a predetermined amount.

6. The method recited in claim 5 wherein said indicating further comprises lighting an indicator light.

7. The method recited in claim 1 wherein said comparing further comprises setting said first estimate to a preselected value in response to refueling.

8. The method recited in claim 1 wherein said comparison further comprises setting said first estimate to a preselected value in response to a memory reset.

9. A method for estimating vehicle fuel consumption and diagnosing a fuel level sensor coupled to vehicle comprising the steps of:
   estimating a first fuel consumed using vehicle operating conditions;
   estimating a second fuel consumed based on the fuel level sensor; and
   determining that the fuel level sensor is degraded based on comparing said first fuel consumed and said second fuel consumed.

10. The method recited in claim 9 wherein the vehicle includes an engine, wherein said operating condition is an engine operating condition, wherein the method further comprises determining a small calibratable tolerance constant and determining if a result of said comparing exceeds said tolerance constant.

11. The method recited in claim 10 wherein said engine operating condition is an air/fuel ratio.

12. The method recited in claim 11 wherein said engine operating condition is mass airflow.

13. The method recited in claim 12 wherein said estimating comprises integrating a product of said air flow and average of said air/fuel ratio across multiple engine cylinder groups.

14. The method recited in claim 10, wherein said determining of a calibratable tolerance constant further comprises determining said constant based on said actual fuel level.

15. The article recited in claim 14 wherein said code for comparing said estimate with said reading further comprises code for comparing the result of said comparison to a calibratable tolerance constant.

16. The method recited in claim 9 further comprising indicating when said degradation determination is made.

17. The method recited in claim 16 wherein said indicating further comprises lighting an indicator light.

18. The method recited in claim 9 wherein said comparing further comprises setting said first estimate to a preselected value in response to a memory reset.

19. The method recited in claim 9 wherein said comparison further comprises setting said first estimate to a preselected value in response to a memory reset.

20. The method recited in claim 9 wherein said estimating of said first fuel consumed comprises integrating fuel injector pulsewidth across multiple engine cylinders.

21. An article of manufacture comprising:
   a computer storage medium having a computer program encoded therein for estimating vehicle fuel consumption and diagnosing a fuel level sensor coupled to a vehicle, said computer storage medium comprising:
      code for estimating a first fuel consumed using vehicle operating conditions;
      code for estimating a second fuel consumed based on the fuel level sensor;
      code for determining a calibratable tolerance constant;
      code for comparing said first estimate with said second estimate; and
      code for determining that the fuel level sensor is degraded if the result of said comparison exceeds said calibratable tolerance.

* * * * *